Jan. 25, 1949.    W. J. BOBEK ET AL    2,459,989
SPRING HOLDING ATTACHMENT FOR AUTOMOBILES
Filed Aug. 1, 1946
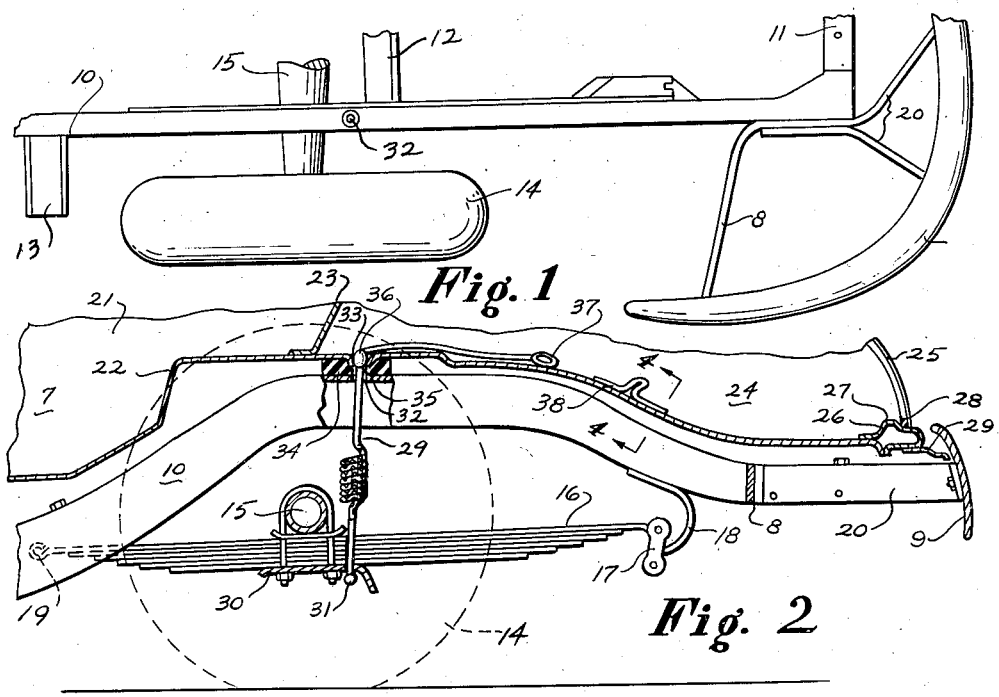
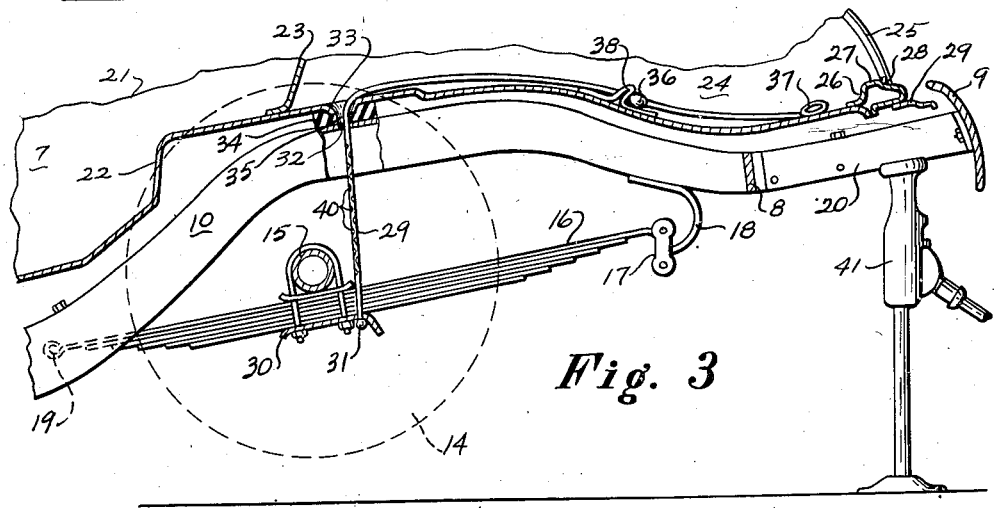
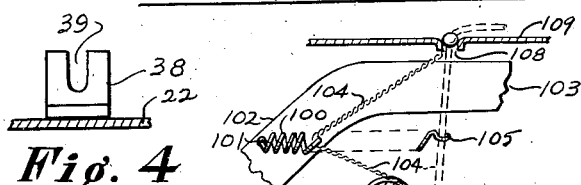
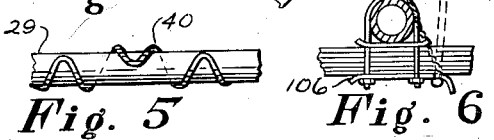
W. J. Bobek
F. W. Wohlfield
INVENTORS
ATTORNEYS Patented Jan. 25, 1949

2,459,989

UNITED STATES PATENT OFFICE 2,459,989

SPRING HOLDING ATTACHMENT FOR AUTOMOBILES

William J. Bobek and Frederick W. Wohlfield, Detroit, Mich., assignors to Ford Motor Company, Dearborn, Mich., a corporation of Delaware Application August 1, 1946, Serial No. 687,648

3 Claims. (Cl. 280—150)

This invention related to the construction of motor vehicles; and, more particularly, to a device to be used in connection with the resiliently supported axles of such vehicles in order to support the axle in a median position when the frame is raised preparatory to changing a wheel mounted on the axle.

For many years it has been the practice to insert an extensible jack between the axle of a motor vehicle and the road surface to raise the axle to permit the changing or servicing of a tire or wheel secured to it. However, as the body of the vehicle became more streamlined and increased in longitudinal overhang, it was no longer feasible to reach the axle for the proper placement of the jack and it was necessary to devise some means by which a lifting device could be applied with greater facility. As a consequence, the bumper jack was developed and is now almost universal in use, since it may be applied with considerably more ease than an axle jack (although it is usually applied to the bumper braces rather than to the bumper bar itself) and because it is out in the open where its operation can be observed and controlled. However, the increased resiliency of the vehicle spring suspension, whether based on coil, torsion bar, or leaf springs, to give greater riding comfort, permits the axle to move downwardly quite freely in response to the weight of the respective unsprung components, so that it is necessary to elevate the frame a considerable additional distance before the wheel is lifted an amount sufficient to permit the necessary tire change. This, of course, is not true with an axle jack, for there the axle is lifted directly and the elevation of the jack is directly reflected in a corresponding rise in the position of the wheel mounted on the axle. This resiliency is not entirely a disadvantage, for it permits lower skirting of the wheel openings in the vehicle fenders so that in normal operation the upper part of the wheel is largely enclosed, but the drop of the axle when the frame is raised permits the wheel to clear through the reduced wheel opening.

It is therefore a purpose of this invention to devise a means which may be engaged when it is desired to raise a given wheel using a bumper jack so that the resiliency of the wheel's spring suspension will not require an excessive elevation of the sprung component. Another object of this invention is to devise a means which may be selectively operated prior to the use of a bumper jack to secure the axle in a predetermined median position as the sprung component is elevated, thereby limiting the amount of extension necessary to be applied by the bumper jack, but permitting sufficient axle drop to allow removal of the wheel through the wheel opening in the fender. Another object of this invention is to devise a simple device which is economical to manufacture, easy to install and certain in operation; but which will not add excessively to the unsprung weight of the vehicle nor be obtrusive so far as the exterior appearance of the car is concerned. Still another object of the invention is to devise a means which may be applied independently to any wheel of the vehicle for selective operation when the respective wheel is to be raised from the ground. Yet another object of this invention is to provide a mounting for such a securing device concealed within the confines of the body—either the engine compartment or trunk—but which will be readily accessible for operation although invisible to the casual observer.

An advantage of the present invention is that a securing device such as outlined in the paragraph above has been developed which is extremely economical in construction, simple in application and certain in operation. It is fully concealed from exterior view. When not engaged, it does not encumber the running gear and is very light in weight so that any adverse effect on the ride characteristics is minimized. The device is resiliently mounted between the sprung component—either the vehicle frame or body— and the axle in such a manner that it does not interfere with the operation of either and is self-compensating when the axle moves relative to the sprung component in response to road variations. Moreover, the device is readily and easily engaged when it is desired to position the axle prior to operation of the jack and secures the wheel in the optimum predetermined position requiring minimum jack elevation but permitting sufficient wheel drop to clear the wheel through the fender opening. When the jack is lowered, the device is readily disengageable and automatically returns to the inactive position to be occupied during normal operation of the vehicle.

Certain other advantages will be apparent from the invention as described at length in the following specification, claimed in the claims, and shown in the accompanying drawings, in which:

Figure 1 is a plan view of the rear side portion of a vehicle frame showing the relationship of the frame sill member, the adjacent portion of the rear axle, the wheel and the bumper.

Figure 2 is a partial longitudinal sectional elevation through the rear portion of the motor vehicle in its normal or running position showing the device of this invention in the inactive position occupied by it under normal conditions.

Figure 3 is an elevation similar to Figure 2 showing the device in use when the frame is raised by a jack preparatory to changing or otherwise repairing a wheel attached to the axle.

Figure 4 is an enlarged view of the retaining means taken as indicated by the arrow 4—4 on Figure 2.

Figure 5 is an enlarged view of a portion of the cable used in the device and showing the resilient coiling means incorporated with it.

Figure 6 is an elevation similar to that of Figure 3 showing a modified form of spring arrangement.

Reference character 10 indicates the side sill of a vehicle frame having a rear cross member 11, intermediate cross member 12 and body bracket 13, the entire frame being resiliently supported in a running gear here represented by a wheel 14 mounted on the axle 15. In this construction, the resilient means is shown as a leaf spring 16 secured to the sill 10 at its rear end by a shackle 17 engaging the curved spring perch 18 and at its forward end to a fixed anchor at the eye 19. However, the device in this invention is equally applicable when any other spring means such, for example, as the torsion bar, coil or transverse leaf springs are employed. A bumper 9 is mounted on the rear of the frame through the rear braces 20 and side brace 8; and the vehicle body 21 having a floor 22 is supported on the frame in the usual manner as by the puck 34 (see Figure 2). A transverse partition 23 divides the forward passenger compartment area 7 from the trunk 24 and the latter is enclosed in the usual manner by an upwardly swinging rear deck, only the lower edge 25 of which is shown. The floor 22 is reinforced along its rearward edge by a transverse member 26 having an elevated ridge 27 against which the lower edge of the deck 25 is adapted to abut through the interposition of a rubber gasket 28 when the deck is in closed position. A stone guard 29 secured to and extending rearwardly from the transverse member 26 adjacent the bumper 9 prevents mud or stones thrown upwardly by the rear wheels from impinging on the rearward surface of the deck 25.

The device of this invention includes a flexible metal cable 29, the lower end of which extends through an opening in the spring mounting plate 30 and terminates in an enlarged ball 31 which is swaged to it, preventing it from being drawn upwardly through the opening. The cable 29 extends upwardly therefrom through an opening 32 in the top of the frame sill 10 and an aligned opening 33 in the floor 22. One of the body pucks 34, on which the body is resiliently supported with respect to the frame, is secured at this point and has an opening 35 aligned with the openings 32 and 33 to permit the free movement of the cable 29 while reinforcing the floor structure 22 with respect to the sill 10 against the localized forces applied during operation of the device. An intermediate ball 36 is also swaged to the cable 29 and the under normal running conditions shown in Figure 2 seats in the opening 33 in response to the inherent resiliency of the cable construction which will be described later. The cable 29 terminates in a ring 37 providing a suitable handle. A bracket 38 is mounted on the floor 22 rearwardly of the opening 33 and has a slot 39 (Figure 4) which will receive the cable 29, but will not permit the intermediate ball 36 to pass. The ball 36 and bracket 38 are so located that when the axle 15 is in substantially the position in which the attached wheel may best be removed and the cable 29 is fully extended, the ball 36 seats immediately behind the bracket 38 as shown in Figure 3.

Cable 29 is quite flexible and associated with it is a preformed single strand wire spring 40 of the type used in connection with telephone or appliance cords and shown in United States Patent 1,790,666 to Huff, which normally coils itself and the associated cable into the position as shown in Figure 2, but its resilient urging may be overcome when the cable is extended to the position shown in Figure 3. This spring comprises a single strand wire primarily bent in spaced alternate loops which are bent in circular form to conform to a circular form to substantially embrace a cylindrical object with the ends of the loops in longitudinally aligned overlapping arrangement. This is then bent to a helix, so that when installed on a flexible cylindrical object such as the cable, the cable is resiliently urged to form a helical coil in conformity with the helix of the spring. Thus the axle 15 has unimpeded movement during normal operation and as shown in Figure 2 the locking device will not interfere with it in any manner. However, when it is desired to lock the axle 15 with respect to the frame, the cable 29 may be readily extended and locked in the position shown in Figure 3 preparatory to jacking up the frame. When so extended and the intermediate ball 36 is seated behind the bracket 38, the jack 41 may be applied to one of the bumper braces 20 and the frame elevated. Since the axle 15 is supported by the cable 29, the wheel 14 is also supported with respect to the frame and a minimum elevation need be given the frame to raise the wheel to a position in which the tire may be removed or replaced. After this is done, the jack may be released and when the tire re-engages the ground, the cable 29 will be loose enough to permit its disengagement from the slot 39 in the bracket 38 and the action of spring 40 will then return the cable 29 to the form shown in Figure 2 and normal operation may be resumed.

While a particular spring mechanism is shown to retract the cable during normal operation, other retracting means may be employed during such periods. Thus, a coil spring 100 having one end 101 attached to the rise 102 in the vehicle frame sill 103 and the other end 105 to the cable 104 may normally tend to draw the cable to one side as indicated in Figure 6 in full line for regular operation. This transverse spring pressure, of course, will be overcome when the cable 104 is engaged in locking position shown in dotted line in the same figure. As before, the lower end of the cable 104 is attached to the spring mounting plate 106 by the swaged ball and extends through an opening 108 in the vehicle floor 109, the intermediate ball 110 preventing further retraction of the cable through the floor. The operation follows the same course described above. However, other means may also be employed to retract the spring, and these will readily occur to those versed in the mechanical arts.

It is realized that certain changes may be made in the specific construction shown and described herein and it is the purpose to cover by the following claims such of these changes as are reasonably within the scope of the invention.

The invention claimed is:

1. In a motor vehicle, a frame, an axle structure including a wheel, a vehicle body secured to said frame and including an enclosed portion, spring means mounting said frame on said axle structure and normally permitting substantial relative vertical movement therebetween, a flexible cable having its lower end secured to said axle structure and extending upwardly therefrom through an opening in said frame and said body and terminating within said body enclosure, coiled spring means engaging at least a part of the extent of said cable and normally urging said cable through said port to assume a retracted position intermediate said axle structure and said frame, a locking element on the upper portion of said cable within said enclosure and larger than said opening through said frame and body and normally held adjacent said opening in response to the urging of said coiled spring means, a locking detent on said body within said enclosure spaced from said opening, said coiled spring means being extensible when said cable is drawn through said opening to permit the engagement of said locking element with said locking detent to restrict the downward movement of said wheel relative to said frame to facilitate the raising of said axle structure through jacking means applied to said frame.

2. In a motor vehicle, a frame, an axle structure including a wheel, spring means mounting said frame on said axle structure and normally permitting substantial relative vertical movement therebetween, a flexible cable having its lower end secured to said axle structure and extending upwardly therefrom to said frame, resilient means associated with said cable and normally urging said cable to assume a minimum effective length during normal operation of said vehicle, said resilient means being extensible to permit a substantial increase in the effective length of said cable to allow the anchoring of said cable relative to said frame and in a position to limit the downward movement of said wheel relative to said frame to facilitate the raising of said wheel through jacking means applied to said frame, said resilient means including a single strand wire bent primarily to form spaced alternate loops bent in circular form to embrace said cable with the ends of said loops in longitudinally aligned overlapping arrangement and said wire secondarily bent to form a helix, and a detent selectively engageable by said cable to secure said cable in extended position.

3. In a motor vehicle, a frame, an axle structure including a wheel, spring means mounting said frame on said axle structure and normally permitting substantial relative movement therebetween, a flexible cable having its lower end secured to said axle structure and extending upwardly therefrom to said frame, resilient means associated with said cable and normally urging said cable to assume a minimum effective length during normal operation of said vehicle, said resilient means being extensible to permit a substantial increase in the effective length of said cable to allow the anchoring of said cable relative to said frame in a position to limit the downward movement of said wheel relative to said frame to facilitate the raising of said wheel through jacking means applied to said frame, said resilient means including a longitudinally extensible spring having one end secured to said cable intermediate said frame and axle structure and the other end secured with respect to said frame, and a detent selectively engageable by said cable to secure said cable in extended position.

WILLIAM J. BOBEK.
FREDERICK W. WOHLFIELD.

REFERENCES CITED

The following references are of record in the file of this patent:

UNITED STATES PATENTS

| Number | Name | Date |
|---|---|---|
| 1,782,400 | Bolard | Nov. 25, 1930 |

FOREIGN PATENTS

| Number | Country | Date |
|---|---|---|
| 35,985 | France (Add. to 651,943) | Dec. 24, 1929 |
| 651,514 | France | Oct. 9, 1928 |
| 848,055 | France | July 17, 1939 |